United States Patent Office 2,861,957
Patented Nov. 25, 1958

2,861,957

BREAKING WATER-IN-OIL EMULSIONS

Eldon B. Cole, Tulsa, and Robert L. Lothringer, Sand Springs, Okla., assignors to Sinclair Refining Company, New York, N. Y., a corporation of Maine No Drawing. Application August 8, 1955
Serial No. 527,134

10 Claims. (Cl. 252—334)

This invention relates to new compositions of matter derived from the reaction of polyalkylene glycol, polycarboxylic acid, and aromatic sulfonic acid. This invention also relates to compositions of matter which have unusual properties with respect to breaking petroleum emulsions of the water-in-oil type.

Well fluids obtained in the production of petroleum are often characterized by high proportions of water, either fresh or brine, together with the crude oil. The crude oil is frequently a petroleum emulsion of the water-in-oil type which comprises fine droplets of naturally occurring water or brine dispersed in more or less permanent state throughout the oil which constitutes the continuous phase of the emulsion. Before the oil can be refined it is necessary to break the emulsion and remove the salt and/or water. Furthermore, it is customary during the refining operations to wash the crude oil with fresh water to remove inorganic impurities. In these washing operations further water-in-oil type emulsions are obtained which also must be resolved.

The novel compounds of this invention which have been found to be effective in resolving emulsions of the water-in-oil type are prepared by reaction of polycarboxylic acid, polyalkylene glycol and aromatic sulfonic acid. Although the exact nature of the reaction product is not known, it is probably a mixture of a plurality of different complex products of the reaction. In the present invention we have discovered that as a result of reacting the above described materials, each within specified molar ratio ranges, highly efficient demulsifying products are obtained. The conditions of time and temperature under which the reactants are subjected make a considerable difference in the final product, at least with regard to the production of demulsifiers of high efficiency.

According to our invention, a polycarboxylic organic acid, preferably a dicarboxylic acid such as diglycollic acid; a polyalkylene glycol; and an aromatic sulfonic acid are heated to a temperature between about 175 to 230° F., and preferably within a range of from about 190 to 215° F. Although the charge materials will react at temperatures above about 230° F., these products even when neutralized are not, however, good demulsifiers. Although elevated or reduced pressures can be used, the heating step is usually carried out at atmospheric pressure, and the reaction mixture is held within the designated temperature range for a period of from about one-half to five hours. We have further established that long time periods during the reaction period are detrimental to the efficiency of the final product and although the process can be carried out within the upper or lower times of the indicated range, our best results have been obtained when employing a time from about one-half to two hours. In establishing the minimum time period the water of reaction must be substantially completely removed. This can be effected by simple distillation or in other conventional ways such as, for example, by forcing a stream of air through the mixture or by adding a low boiling naphtha to effect an azeotropic mixture which can be separated by distillation at temperatures below the boiling point of water. The azeotropic mixture can be resolved by solvent extraction or other processes for recovery of the solvent.

Suitable aromatic sulfonic acids employed in the present invention include those of at least about 250 molecular weight, for instance, the oil-soluble petroleum sulfonic acids usually designated as mahogany acids which are derived by the sulfonation of mineral oil stocks such as petroleum gas oils and lubricating oil distillates. While these petroleum sulfonic acids may vary as to the exact chemical structure, it now appears that they are composed to a large extent of sulfonated aromatic hydrocarbons having either one or two aromatic rings per molecule possibly with one or more long chain alkyl groups and the sulfonic acid radical attached to the ring nuclei. Among the useful water-soluble aromatic-containing sulfonic acids which can be employed are the petroleum green acids. Generally, the molecular weight of the sulfonic acid will not be more than about 5000 and those of less than about 1000 molecular weight are preferred. The sulfonic acids of less than about 500 molecular weight are most often employed.

A particularly good material useful in the practice of this invention is a product hereinafter referred to as C-Base sulfonic acids. These sulfonic acids are oil-soluble and are prepared by the sulfonation of the bottoms produced in the manufacture of monododecylbenzene, i. e. the bottoms remaining after fractionation to remove the monododecylbenzene from the reaction products of dodecene with benzene, which bottoms consist essentially of di-dodecylbenzene along with a minor amount of other polyalkylated benzene molecules. Other suitable aromatic sulfonic acids are benzene sulfonic acid, and particularly alkyl aryl sulfonic acids such as isopropyl benzene sulfonic acid and those acids in which the alkyl chain has at least about 12 and preferably not more than about 18 carbon atoms. The polynuclear sulfonic acids such as naphthalene sulfonic acid particularly alkylated naphthalene sulfonic acids are also useful. This includes those in which the alkyl chain has at least about 12 and preferably not more than about 18 carbon atoms. Among the sulfonic acids we prefer those having a monocyclic nucleus.

The polycarboxylic acids useful in the present invention include those of up to about 5000 molecular weight with acids of up to 1500 molecular weight being most advantageous. Dicarboxylic acids and their mixtures with other polycarboxylic acids containing more than two carboxyl groups are preferred. Acids suitable for use in preparing the novel demulsifiers of this invention include those having less than 12 carbon atoms such as the aliphatic saturated dicarboxylic acids, adipic acid, sebacic acid and diglycollic acid. Similarly, the polycarboxylic acids containing up to 36 carbon atoms as, for example, brassylic acid or tetracosanedicarboxylic acid, may also be employed. One mixed acid product which can be employed is identified as VR-1 (Rohm and Haas Co.), and is a mixture of polycarboxylic acids produced as still bottoms in the manufacture of sebacic acid. Advantageously, this product may be used alone or in combination with any of the above described dicarboxylic acids. Diglycollic acid is that most preferred in making our novel products.

The polyalkylene glycol reactants of our invention advantageously contains about 5 to 100 ether oxygen atoms, preferably not more than about 75 ether oxygen atoms, per molecule with the alkylene radicals containing from about 2 to 4 carbon atoms. Included within this group are the polyethylene and polypropylene glycols and mixed polyalkylene glycols such as ethylene-propylene polyglycols in which the ethylene oxide group comprises up to about 40 weight percent of the molecule. These mixed glycols are readily prepared by treating a polyalkylene glycol with an alkylene oxide, for example, by the treatment of polypropylene glycol with ethylene oxide. Preferred glycols are polypropylene glycols of about 1000 to 3000 molecular weight which, when desired, have added from about 10 to 40 weight percent of ethylene oxide. Among the specific polyalkylene glycols employed in this invention are polypropylene glycols of 1750 and 1500 molecular weight, each having added 10 weight percent of ethylene oxide, and polypropylene glycol of 2500 molecular weight having added 25% of ethylene oxide. Other suitable glycols include di-1,3-propylene glycol, triethylene glycol, propylene-butylene glycol, and the like.

In obtaining the demulsifiers of the present invention, molar ratios of from 1 to 8 and preferably 2 to 8 moles of dicarboxylic acid and 1 to 4 moles of sulfonic acid per mole of polyalkylene glycol are reacted at the conditions previously discussed. These reactant ratios are considered important inasmuch as the demulsifying properties of the final product will vary widely depending upon the molar ratios employed. Thus, an excess amount of sulfonic acid affords degradation products whereas unreacted dicarboxylic acid remains if the sulfonic acid employed be present in an insufficient amount. Moreover, the defined ratio of sulfonic acid is necessary to obtain a low temperature reaction. In this invention particularly good results have been obtained when using molar ratios of from 2 to 6 moles of polycarboxylic acid and 2 to 3 moles of sulfonic acid per mole of polyalkylene glycol.

In preparing our demulsifying products, the use of a solvent has proved highly advantageous. Selection of the solvent will vary, depending upon the solubility of the product obtained. Any suitable solvent can be employed to dilute the finished product or, if desired, the reaction can be conducted in such solvent. Suitable solvents include the petroleum hydrocarbons, benzene, kerosene, light fuels, toluene and xylene, and the essentially aromatic solvents are preferred. In particular, we have effectively employed a highly aromatic petroleum hydrocarbon solvent having an API gravity of 20.1, a mixed aniline point of 47.9, and a boiling range of from about 400 to 600° F.

In carrying out the process for the preparation of our demulsifiers, the final product may be neutralized for the purpose of preventing corrosion with respect to storing or shipping the product in metal containers. In general, neutralization may be effected with sodium hydroxide, anhydrous ammonia or with amines such as ethyl amine, triethanol amine, or a fatty diamine salt. Good neutralization agents are fatty diamines, particularly those of the formula

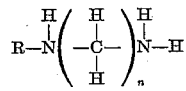

where R is a hydrocarbon radical of about 12 to 18 carbon atoms and $n$ is a number from 2 to 4. A specific fatty diamine is derived from tallow fatty acids in which R is an hydrocarbon radical of 16 to 18 carbon atoms length, both saturated and unsaturated and $n$ is 3. This product is identified as Duomeen T or propyl tallow diamine. In general, neutralization with the fatty diamine is preferred since no sulfonates are produced from the presence of any free sulfuric acid. Neutralization can be carried out at about reaction temperature for about one-half to one hour with constant agitation of the mixture.

As previously stated, the novel demulsifying product described herein is used to resolve emulsions of the water-in-oil type, particularly crude petroleum oil emulsions. The product may be added directly to the emulsion or may be dissolved in a solvent and then added to the emulsion. The effective amount of demulsifier employed will vary as known in the art depending upon the nature of the emulsion treated, e. g. one part of demulsifier per 1000 to 50,000 parts of the emulsion. In general, in resolving petroleum emulsions of the water-in-oil type, a relatively minor amount of demulsifier is added to the emulsion to sufficiently produce a clean substantially dehydrated oil.

The invention will be further described in the following specific examples which are regarded as illustrative and not as restricting the scope of the invention.

*Example I*

86 grams of polypropylene glycol (molecular weight 1750) containing 10% of ethylene oxide were charged to an electrically heated kettle and brought to 160° F. 16 grams of diglycollic acid and 58 grams of sulfonic acid (water-soluble green acids, molecular weight about 325) were added to the kettle and the temperature raised quickly to 200° F. with constant agitation. Substantially complete removal of the $H_2O$ of reaction was effected in 1 hour at temperatures of 200 to 210° F. 112 grams of a highly aromatic solvent having an API gravity of 20.1, a mixed aniline point of 47.9 and a boiling range of 400 to 600° F. were added to the mass and the product was then neutralized with 40 grams of Duomeen T. Neutralization was effected in 1 hour with vigorous agitation at a temperature of 195 to 200° F. The final product gave a highly oil-soluble material which was insoluble in $H_2O$.

*Example II*

135 grams of polypropylene glycol (molecular weight 1750) were brought to 160° F. in an electric kettle. 25 grams of diglycollic acid, 78 grams of C-Base sulfonic acids (molecular weight 350 to 400) were added to the glycol and the temperature raised rapidly to 200° F. with constant agitation. Substantially complete dehydration was effected in 1 hour at a temperature of 200 to 210° F. The reaction mass was mixed with 184 grams of the aromatic solvent of Example I and the mixture then separated into equal portions. One portion was neutralized with 26.5 grams of Duomeen T and the other with 4.5 grams of ethylene diamine. Neutralization was effected in 1 hour at a temperature of 195 to 200° F. with vigorous agitation. The neutralized products were effective for resolution of water-in-oil emulsions.

*Example III*

467 pounds of polypropylene glycol, molecular weight 2500, containing 25% ethylene oxide, were charged to an electrically heated kettle and brought to 160° F. 50 pounds of diglycollic acid, 144 pounds of C-Base sulfoic acids and 156 pounds of the aromatic solvent of Example I were charged to the kettle and the temperature brought to 210° F. with constant agitation. Air was introduced into the bottom of the kettle and the mass was substantially completely dehydrated in 1 hour at a temperature of 230° F. The air was shut off and the mass was mixed with 235 pounds of the aromatic solvent. 111 pounds of Duomeen T were added and the mixture was neutralized in 1 hour at 195 to 200° F. with vigorous agitation. After cooling the finished product was withdrawn from the reaction kettle. This product was effective for demulsification of water-in-oil emulsions.

*Example IV*

467 pounds of polypropylene glycol, molecular weight 2500, containing 25% ethylene oxide, were charged to an electrically heated kettle and brought to 160° F. 50 pounds of diglycollic acid and 144 pounds of C-Base sulfonic acids were charged to the kettle and the temperature brought to 210° F. with constant agitation. Air was introduced into the bottom of the kettle and the mass was substantially completely dehydrated in 1 hour at a temperature of 230° F. The air was shut off and the mass was mixed with 500 pounds of the aromatic solvent of Example I. 111 pounds of Duomeen T were added and the mixture was neutralized for 1 hour at 195 to 200° F. with vigorous agitation. After cooling the finished product was withdrawn from the reaction kettle. The product was then diluted with enough of the aromatic solvent to give 220 gallons of finished demulsifier.

*Example V*

130 grams of polypropylene glycol of 2500 molecular weight were charged to a kettle and heated to 160° F. 63 grams of VR-1 acid (acid No. 150, 1000 molecular weight), 8.3 grams of diglycollic acid and 48 grams of sulfonic acid were added to the kettle and the temperature raised quickly to 200° F. with vigorous agitation. Substantially complete dehydration was effected in 1 hour at a temperature of 210° F. The reaction product was treated with 152 grams of the aromatic solvent of Example I and subsequently neutralized with 35 grams of Duomeen T at 195° to 200° F. for 1 hour. The final product was diluted with the solvent to give 680 cc. of finished demulsifier.

*Example VI*

The purpose of this example is to illustrate the effectiveness of our demulsifier in resolving water-in-oil emulsion, as found in the petroleum industry. 5 parts by weight of the diluted demulsifying agent of Example IV were mixed with 95 parts by weight of xlyene. An emulsion was taken from a pumping oil well in Bemis pool, Ellis County, Kansas, Arbuckle formation. ½ cc. of the demulsifier solution was mixed with 100 cc. of emulsion at about 70° F. The mixture was agitated and in 20 minutes time 30 cc. of water had separated from the oil. The upper 25% of oil was subjected to a centrifuge test and the centrifuged oil contained 0.2% water. A commercial demulsifier tested under the same conditions gave 1 cc. of H₂O separation by pipette; the centrifuge test showed 2.0% H₂O in the centrifuged oil.

The following examples illustrate a desalting test on a salt-containing crude oil composite taken from the Velma, Oklahoma area.

*Example VII*

60 cc. of fresh water were mixed in a high speed blender with 600 cc. of the oil sample which had been heated to 150° F. To 100 cc. of the emulsion so formed, 1 cc. of diluted agent prepared in Example V was added as a 1% solution in xylene to the emulsion. The mixture was agitated and then placed in a water bath at a temperature of 170° F. In 20 minutes time, 9 cc. of water had separated from the oil. By centrifuge test, the centrifuged oil showed 0.9% of water remaining.

*Example VIII*

A demulsifier prepared by the procedure in Example I was designated as Agent "A" and used for desalting tests. As shown by the data below, Agent A is definitely superior to any of the commercial desalting chemicals tested. An emulsion was produced by the agitation in a high speed blender of 600 cc. of sweet Mid-Continent crude oil and 60 cc. of tap water testing 8 pH. To separate 100 cc. portions of this emulsion were added 0.5 cc. of a 1% solution in xylene of Agent A and five commercial desalt chemicals designated as B, C, D, E and F. The samples were shaken 100 times by hand to disperse the chemical and then placed in a constant temperature bath at 170° F. After 25 minutes the samples were observed and the free water withdrawn with a pipette after which the remaining oil was centrifuged to determine the BS and water content of the centrifuged oil. Results were as follows:

| Agent | cc. of Water Drawn | Appearance of Oil | Centrifuge Test | |
|---|---|---|---|---|
| | | | BS, Percent | Water Percent |
| A | 8.0 | Very bright | 0.3 | 0.2 |
| B | 2.0 | Slightly cloudy | 6.2 | 0.8 |
| C | 2.0 | Cloudy | 6.2 | 0.8 |
| D | 3.0 | Slightly cloudy | 5.4 | 0.6 |
| E | 3.0 | Cloudy | 3.5 | 0.5 |
| F | 5.0 | Cloudy | 5.1 | 1.4 |

We claim:
1. The method of breaking a water-in-oil emulsion which comprises treating said emulsion with a demulsifying agent prepared by reacting at about 175° to 230° F. an aromatic sulfonic acid of about 250 to 5000 molecular weight, polycarboxylic acid of up to about 5000 molecular weight and polyalkylene glycol having up to about 100 ether oxygen atoms, and the alkylene radical thereof containing from 2 to 4 carbon atoms, in the ratio of about 1 to 4 moles of aromatic sulfonic acid and about 1 to 8 moles of polycarboxylic acid per mole of polyalkylene glycol, said reaction continuing at least until the product is substantially completely dehydrated.

2. The method of claim 1 wherein the polycarboxylic acid is diglycollic acid, the polyalkylene glycol is a polypropylene glycol of about 1000 to 3000 molecular weight having added up to about 40% of ethylene oxide, and the aromatic sulfonic acid is the sulfonated bottoms produced from the reaction of dodecene with benzene, which bottoms consist essentially of didodecyl benzene.

3. The method of claim 1 in which the aromatic sulfonic acid is petroleum green acids, the polyalkylene glycol is polypropylene glycol of about 1000 to 3000 molecular weight having added up to about 40% of ethylene oxide, and the polycarboxylic acid is diglycollic acid.

4. The method of claim 2 in which the demulsifier product is neutralized with a diamine having the general formula:

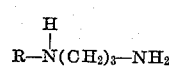

wherein R is a hydrocarbon radical having about 16 to 18 carbon atoms derived from tallow fatty acids.

5. The method of claim 3 in which the demulsifier is neutralized with a diamine having the general formula:

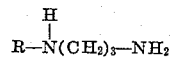

wherein R is a hydrocarbon radical having about 16 to 18 carbon atoms derived from tallow fatty acids.

6. The product useful in breaking water-in-oil emulsions produced by reacting at about 175° to 230° F. an aromatic sulfonic acid of about 250 to 5000 molecular weight, polycarboxylic acid of up to about 5000 molecular weight and polyalkylene glycol having up to about 100 ether oxygen atoms, and the alkylene radical thereof containing from 2 to 4 carbon atoms, in the ratio of about 1 to 4 moles of aromatic sulfonic acid and about 1 to 8 moles of polycarboxylic acid per mole of polyalkylene glycol, said reaction continuing at least until the product is substantially completely dehydrated.

7. The product of claim 6 wherein the polycarboxylic acid is diglycollic acid, the polyalkylene glycol is a polypropylene glycol of about 1000 to 3000 molecular weight having added up to about 40% of ethylene oxide, and the aromatic sulfonic acid is the sulfonated bottoms produced from the reaction of dodecene with benzene, which bottoms consist essentially of didodecyl benzene.

8. The product of claim 6 wherein the sulfonic acid is petroleum green acids, the polyalkylene glycol is polypropylene glycol of about 1000 to 3000 molecular weight having added up to about 40% ethylene oxide, and the polycarboxylic acid is diglycollic acid.

9. The product of claim 7 wherein said product is neutralized with a diamine having the general formula:

$$R-\underset{\underset{H}{|}}{N}(CH_2)_3-NH_2$$

wherein R is a hydrocarbon radical having about 16 to 18 carbon atoms derived from tallow fatty acids.

10. The product of claim 8 wherein said product is neutralized with a diamine having the general formula:

$$R-\underset{\underset{H}{|}}{N}(CH_2)_3-NH_2$$

wherein R is a hydrocarbon radical having about 16 to 18 carbon atoms derived from tallow fatty acids.

References Cited in the file of this patent

UNITED STATES PATENTS

| | | |
|---|---|---|
| 2,295,167 | De Groote et al. | Sept. 8, 1942 |
| 2,312,733 | Salathiel | Mar. 2, 1943 |
| 2,312,735 | Salathiel | Mar. 2, 1943 |
| 2,354,993 | Harlan | Aug. 1, 1944 |